(12) United States Patent
Lake

(10) Patent No.: US 10,704,451 B2
(45) Date of Patent: Jul. 7, 2020

(54) HEAT EXCHANGER FOR AN APPARATUS

(71) Applicants:Castrol Limited, Pangbourne, Reading (GB); Timothy Hugh Lake, Steyning, West Sussex (GB)

(72) Inventor: Timothy Hugh Lake, Steyning (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 16/065,684

(22) PCT Filed: Dec. 16, 2016

(86) PCT No.: PCT/EP2016/081416
§ 371 (c)(1),
(2) Date: Jun. 22, 2018

(87) PCT Pub. No.: WO2017/108608
PCT Pub. Date: Jun. 29, 2017

(65) Prior Publication Data
US 2019/0003369 A1 Jan. 3, 2019

(30) Foreign Application Priority Data

Dec. 23, 2015 (GB) .................................. 1522732.5

(51) Int. Cl.
*F01P 3/20* (2006.01)
*F01M 5/00* (2006.01)
(Continued)

(52) U.S. Cl.
CPC ............ *F01P 3/20* (2013.01); *B60H 1/00492* (2013.01); *F01M 5/001* (2013.01); *F01M 11/0458* (2013.01); *F02N 19/10* (2013.01); *F01M 5/00* (2013.01); *F01M 2011/0483* (2013.01); *F01P 2011/205* (2013.01); *F28D 20/0034* (2013.01); *F28D 20/02* (2013.01); *F28D 20/028* (2013.01); *F28D 2020/0026* (2013.01)

(58) Field of Classification Search
CPC .... F01M 5/001; F01M 5/021; F01M 11/0004; F01M 2011/0025; F01M 2011/033; F01M 5/00
See application file for complete search history.

(56) References Cited

U.S. PATENT DOCUMENTS 4,151,823 A 5/1979 Grosse et al.
5,454,354 A 10/1995 Miller
(Continued)

FOREIGN PATENT DOCUMENTS

CN 101761380 6/2010
DE 10 2012024365 6/2014
(Continued)

*Primary Examiner* — Long T Tran
(74) *Attorney, Agent, or Firm* — McDonnell Boehnen Hulbert & Berghoff LLP

(57) ABSTRACT

In one embodiment, there is provided a heat exchanger for equipment, having: at least one phase change material; and at least one heat exchange interface for heat exchange between the phase change material and a fluid flowing within, into and/or from a replaceable fluid container for the equipment, the replaceable fluid container having at least one fluid port adapted to couple to a fluid circulation system of the equipment when the replaceable container is coupled to a dock.

20 Claims, 3 Drawing Sheets

(51) Int. Cl.
  *B60H 1/00*   (2006.01)
  *F01M 11/04*  (2006.01)
  *F02N 19/10*  (2010.01)
  *F28D 20/02*      (2006.01)
  *F01P 11/20*      (2006.01)
  *F28D 20/00*      (2006.01)

(56) References Cited

U.S. PATENT DOCUMENTS

| | | | |
|---|---|---|---|
| 9,869,219 B2 | 1/2018 | Barnes et al. | |
| 9,878,822 B2 | 1/2018 | Barnes et al. | |
| 9,890,901 B2 | 2/2018 | Brett et al. | |
| 9,938,867 B2 | 4/2018 | Brett et al. | |
| 10,167,755 B2 | 1/2019 | Andersen et al. | |
| 2002/0157621 A1 | 10/2002 | Lefrancois et al. | |
| 2011/0073546 A1* | 3/2011 | Mordukhovich | B01D 17/085 210/640 |
| 2011/0253092 A1 | 10/2011 | Springer et al. | |
| 2014/0331946 A1* | 11/2014 | Eilemann | F01M 5/021 123/41.14 |
| 2015/0292372 A1 | 10/2015 | Barnes et al. | |
| 2016/0010520 A1* | 1/2016 | Will | F01M 5/021 123/196 AB |
| 2016/0159195 A1 | 6/2016 | Azzouz et al. | |
| 2017/0089234 A1 | 3/2017 | Dawson et al. | |
| 2017/0089235 A1 | 3/2017 | Dawson et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 | 6/2017 | Barnes et al. | |
| 2017/0190466 A1 | 7/2017 | Andersen et al. | |
| 2017/0197596 A1 | 7/2017 | Barnes et al. | |
| 2017/0248375 A1* | 8/2017 | Blair | F16H 57/0417 |
| 2018/0258805 A1 | 9/2018 | Goodier et al. | |
| 2018/0258806 A1 | 9/2018 | Butterworth et al. | |
| 2018/0266288 A1 | 9/2018 | Butterworth et al. | |
| 2018/0266873 A1 | 9/2018 | Goodier et al. | |
| 2018/0274408 A1 | 9/2018 | Goodier et al. | |
| 2019/0001954 A1 | 1/2019 | Ali et al. | |

FOREIGN PATENT DOCUMENTS

| | | |
|---|---|---|
| DE | 10 2013 220281 | 4/2015 |
| EP | 0 424 700 | 5/1991 |
| EP | 2 985 562 | 2/2016 |
| GB | 2516953 | 2/2015 |
| JP | 2002-071090 | 3/2002 |
| JP | 2005-036677 | 2/2005 |
| WO | WO 98/34073 | 8/1998 |
| WO | WO 2009/112194 | 9/2009 |
| WO | WO 2013/143897 | 10/2013 |
| WO | WO 2014/056855 | 4/2014 |
| WO | WO 2016/158971 | 10/2016 |

* cited by examiner

HEAT EXCHANGER FOR AN APPARATUS

CROSS REFERENCE TO RELATED APPLICATIONS

This application is a National Phase application of, and claims the benefit of, International (PCT) Application No. PCT/EP2016/081416, filed Dec. 16, 2016, which claims priority to GB Patent Application No. 1522732.5, filed Dec. 23, 2015, each of which is hereby incorporated by reference in its entirety.

This invention relates to a heat exchanger for equipment, such as a vehicle, which may be coupled to a fluid system such as a fluid container. This invention also relates to associated apparatus and equipment such as a vehicle.

Many vehicle engines use one or more fluids for their operation. Such fluids are often liquids. For example, internal combustion engines use liquid lubricating oil. Also, electric engines use fluids which can provide heat exchange functionality, for example to cool the engine and/or to heat the engine, and/or to cool and heat the engine during different operating conditions. The heat exchange functionality of the fluids may be provided in addition to other functions (such as a primary function) which may include for example charge conduction and/or electrical connectivity. Such fluids are generally held in reservoirs associated with the engine and may require periodic replacement.

Such fluids often are consumed during operation of the engine. The properties of such fluids may also degrade with time so that their performance deteriorates, resulting in a need for replacement with fresh fluid. Such replacement may be an involved and time-consuming process. For example, replacement of engine lubricating oil in a vehicle engine usually involves draining the lubricating oil from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil.

Aspects and embodiments of the present disclosure are directed to a heat exchanger for equipment, such as a vehicle, which may be coupled to a fluid system such as a fluid container. Aspects and embodiments of the present disclosure are directed to associated apparatus comprising a heat exchanger according to any aspect of the disclosure and to equipment, such as a vehicle, comprising a heat exchanger according to any aspect of the disclosure.

Aspects of the invention are recited in the independent claims and preferred features are recited in the dependent claims.

Some embodiments will now be described, by way of example only, with reference to the accompanying drawings, in which.

Figure 2:
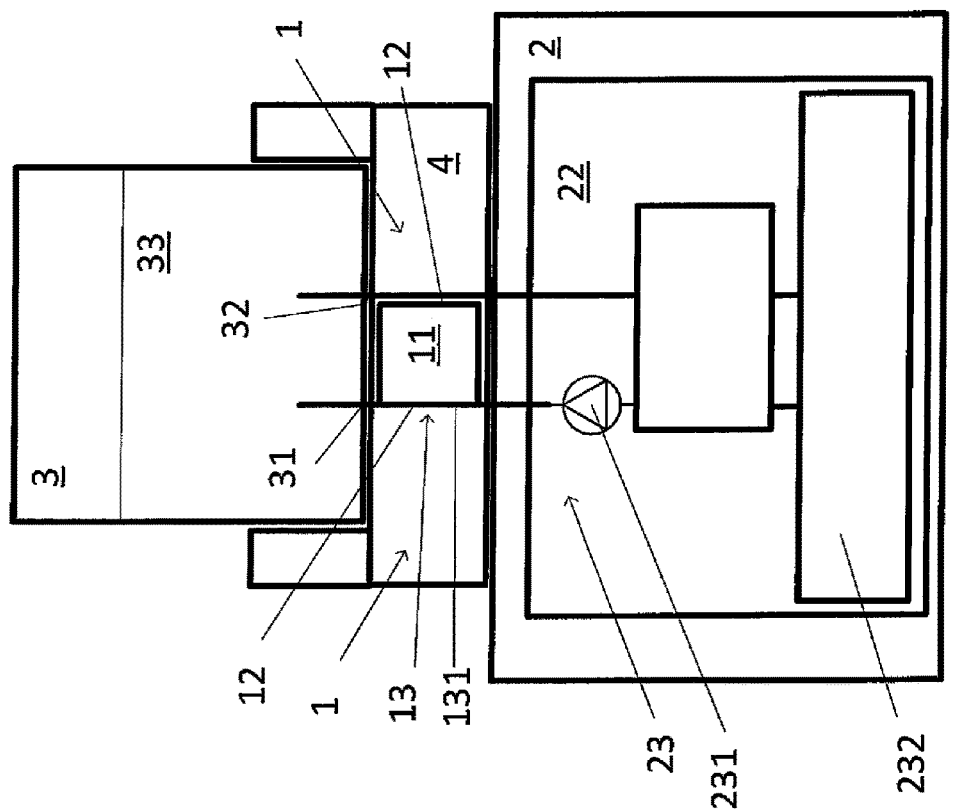
FIG. 2 shows a schematic illustration of a second example heat exchanger.

Embodiments of the present disclosure provide, as shown for example in FIGS. 1 to 5, a heat exchanger 1 for a vehicle 2. In the examples illustrated by FIGS. 1 to 5, a replaceable fluid container 3 for the vehicle 2 is coupled to a dock 4. In the examples illustrated by FIGS. 1 to 5, the replaceable fluid container 3 comprises a fluid 33 within the replaceable fluid container 3 and also comprises at least one fluid port 31 or 32 adapted to couple to a fluid circulation system 23 of the vehicle 2. The fluid port 31 is a fluid inlet port 31 of the replaceable fluid container 3 and the fluid port 32 is a fluid outlet port 32 of the replaceable fluid container 3.

In the examples of FIGS. 1 to 5, the heat exchanger 1 comprises at least one phase change material 11, and at least one heat exchange interface 12.

In the examples of FIGS. 1 to 5, the heat exchange interface 12 is configured for heat exchange between the phase change material 11 and the fluid 33 flowing within, into and/or from the replaceable fluid container 3.

The phase change material 11 is a latent heat accumulator and is configured to change state from solid to liquid to store heat received through the heat exchange interface 12 from the fluid 33 flowing within, into and/or from the replaceable fluid container 3, for example when the fluid 33 has been heated up, e.g. by an engine 22 of the vehicle 2 and/or an engine temperature regulating system, e.g. when the engine 22 and/or the fluid 33 are at a nominal operating temperature. The phase change material 11, once in a liquid phase, is configured to store the heat, e.g. after the engine 22 is shut down and e.g. up until a cold restart of the engine 22 and/or up until the fluid 33 has cooled down. The heat stored in the phase change material 11 may be accessed through the heat exchange interface 12 by the fluid 33 flowing within, into and/or from the replaceable fluid container 3, to provide fast warm up of the fluid 33, e.g. to reduce friction, emissions (such as $CO_2$) and/or fuel consumption in case the fluid 33 is a lubricating oil. In some examples, depending on the amount of heat transferred from the phase change material 11 to the fluid 33, the phase change material 11 may change state from liquid to solid when heat is transferred to the fluid 33 flowing within, into and/or from the replaceable fluid container 3, and the change from solid state to liquid state described above can be repeated.

In the present disclosure, "replaceable" means that:
the container can be supplied full with fresh and/or unused fluid, and/or
the container can be coupled to, i.e. e.g. inserted and/or seated and/or docked in the dock, in a non-destructive manner, and/or
the container can be removed from the dock, in a non-destructive manner, i.e. in a manner which enables its re-coupling should that be desired, and/or
the same (for example after having been refilled) or another (for example full and/or new) container can be re-coupled to the dock, e.g. re-inserted and/or re-seated and/or re-docked in the dock, in a non-destructive manner.

It should be understood that the term "replaceable" means that the container may be "replaced" by another new container and/or the same container after having been refilled (in other words the replaceable container may be "refillable") which may be re-coupled to the dock, e.g. re-inserted in the dock.

In the present disclosure, "in a non-destructive manner" means that integrity of the container is not altered, except maybe for breakage and/or destruction of seals (such as seals on fluid ports) or of other disposable elements of the container.

It should be understood that the term "configured to be" encompasses the meaning "is".

In the examples of FIGS. 1 to 5, the flow of fluid 33 to the replaceable fluid container 3 is caused by a pump 231 of the fluid circulation system 23 of the vehicle 2. In the examples of FIGS. 1 to 5, the fluid circulation system 23 of the vehicle 2 also comprises a sump 232, e.g. a fluid sump, such as a lubricating oil sump. In the examples of FIGS. 1 to 5, the pump 231 may be a scavenging pump. In the examples of FIGS. 1 to 4, the fluid supply from the container 3 to the fluid circulation system 23 may be provided e.g. by gravity, but in the example illustrated by FIG. 5, the fluid supply may be performed by a pump 15c of the fluid circulation system 23 of the vehicle 2.

Figure 1:
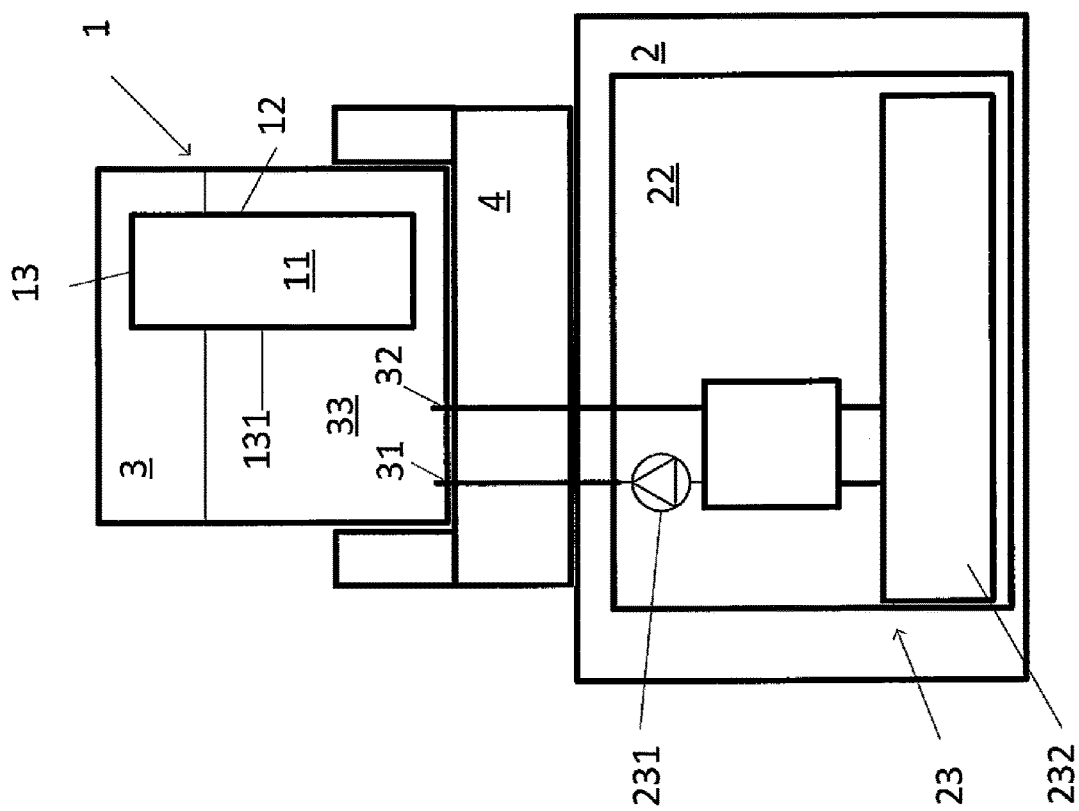
FIG. 1 shows a schematic illustration of a first example heat exchanger.

In the example illustrated by FIG. 1, the heat exchanger 1 for the vehicle 2 comprises the phase change material 11 and the heat exchange interface 12.

In the example illustrated by FIG. 1, the phase change material 11 is configured to be located in the replaceable fluid container 3. In the example illustrated by FIG. 1, the heat exchange interface 12 is also configured to be located in the replaceable fluid container 3.

In the example illustrated by FIG. 1, the phase change material 11 is contained in a receptacle 13. In the example illustrated by FIG. 1, the receptacle 13 is housed within the replaceable fluid container 3. In the example illustrated by FIG. 1, the heat exchange interface 12 is provided on the receptacle 13 containing the phase change material 11, e.g. on at least one wall 131 of the receptacle 13.

In the example of FIG. 1, the heat exchange interface 12 is configured for heat exchange between the phase change material 11 and the fluid 33 at least flowing within the replaceable fluid container 3, e.g. when fluid flows to or from the replaceable fluid container 3.

The example illustrated by FIG. 2 comprises elements of the example illustrated by FIG. 1. The elements in common in the examples illustrated by FIG. 2 and by FIG. 1 will not be described here for the sake of conciseness and clarity.

In the example illustrated by FIG. 2, the heat exchanger 1 for the vehicle 2 comprises the phase change material 11 and the heat exchange interface 12. In the example illustrated by FIG. 2, the phase change material 11 is configured to be located in the dock 4. In the example illustrated by FIG. 2, the heat exchange interface 12 is also configured to be located in the dock 4.

In the example illustrated by FIG. 2, the phase change material 11 is contained in a receptacle 13. In the example illustrated by FIG. 2, the receptacle 13 is housed within the dock 4 and located in proximity with the fluid circulation system 23 of the vehicle 2. In the example illustrated by FIG. 2, the heat exchange interface 12 is provided on the receptacle 13 containing the phase change material 11. Additionally or alternatively, at least a part of the receptacle 13 containing the phase change material 11 is configured to form at least a part of the fluid circulation system 23, e.g. a wall 131 of the receptacle 13 may form part of the fluid circulation system 23.

In the example of FIG. 2, the heat exchange interface 12 is configured for heat exchange between the phase change material 11 and the fluid 33 at least flowing to or from the replaceable fluid container 3, e.g. when fluid flows through the fluid port 31 or 32 from or to the fluid circulation system 23.

Figure 3:
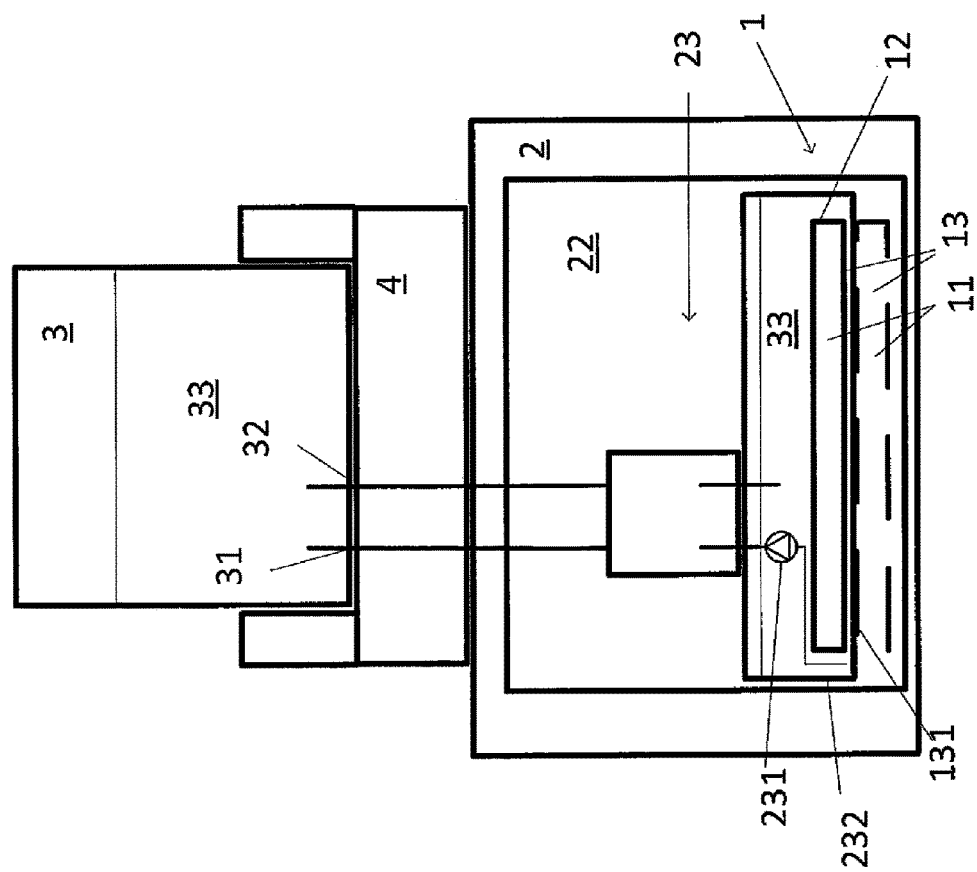
FIG. 3 shows a schematic illustration of a third example heat exchanger.

The example illustrated by FIG. 3 comprises elements of the example illustrated by FIG. 1. The elements in common in the examples illustrated by FIG. 3 and by FIG. 1 will not be described here for the sake of conciseness and clarity.

In the example illustrated by FIG. 3, the heat exchanger 1 for the vehicle 2 comprises the phase change material 11 and the heat exchange interface 12.

In the example illustrated by FIG. 3, the phase change material 11 is configured to be located in a part of the vehicle 2 other than the dock 4. In the example illustrated by FIG. 3, the heat exchange interface 12 is also configured to be located in a part of the vehicle 2 other than the dock 4. In the example illustrated by FIG. 3, the phase change material 11 and the heat exchange interface 12 are configured to be located, at least partly, in the sump 232 of the engine 22 of the vehicle 2.

In the example illustrated by FIG. 3, the phase change material 11 is contained in a receptacle 13. In the example illustrated by FIG. 3, the receptacle 13 is housed within the sump 232 of the fluid circulation system 23 of the vehicle 2. In the example of FIG. 3, the pump 231 may be a scavenging pump. In the example of FIG. 3, the fluid supply from the container 3 to the fluid circulation system 23 may be provided e.g. by gravity, but embodiments with at least one supply pump in the fluid circulation system are also envisaged.

In the example illustrated by FIG. 3, the heat exchange interface 12 is provided on the receptacle 13 containing the phase change material 11 and which is in contact with the fluid 33 in the sump 232 when the fluid is in circulation in the fluid circulation system 23. Additionally or alternatively, at least a part of the receptacle 13 containing the phase change material 11 is configured to form at least a part of the sump 232 of the fluid circulation system 23, e.g. a wall 131 of the receptacle 13 may form part of the fluid circulation system 23, as illustrated by the dotted lines in the example illustrated by FIG. 3.

In the example of FIG. 3, the heat exchange interface 12 is configured for heat exchange between the phase change material 11 and the fluid 33 at least flowing in the sump 232 when fluid is flowing to or from the replaceable fluid container 3 in the fluid circulation system 23.

Figure 4:
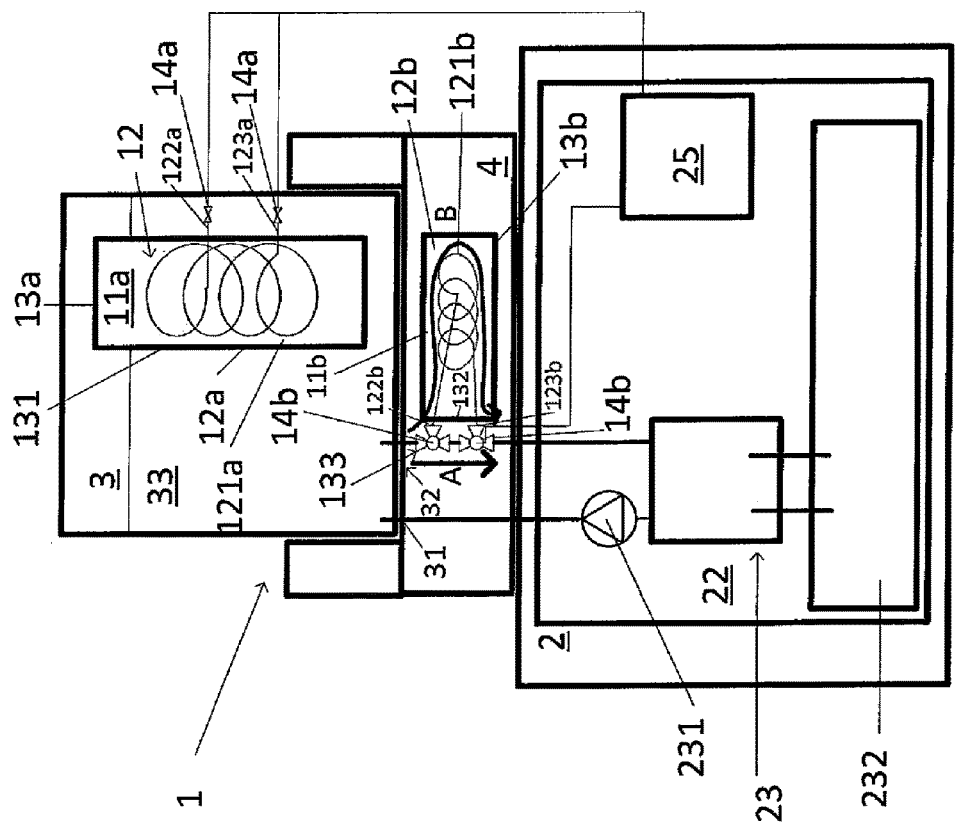
FIG. 4 shows a schematic illustration of a fourth example heat exchanger.

The example illustrated by FIG. 4 comprises elements of the example illustrated by FIG. 1. The elements in common in the examples illustrated by FIG. 4 and by FIG. 1 will not be described here for the sake of conciseness and clarity.

In the example illustrated by FIG. 4, the heat exchanger 1 for the vehicle 2 comprises:
  the phase change material 11a configured to be located in the replaceable fluid container 3; and
  the phase change material 11b configured to be located in the dock 4.

In the example illustrated by FIG. 4, the heat exchanger 1 for the vehicle 2 also comprises:
  the heat exchange interface 12a configured to be located in the replaceable fluid container 3; and
  the heat exchange interface 12b configured to be located in the dock 4.

In the example illustrated by FIG. 4, the phase change material 11a located in the replaceable fluid container 3 and the phase change material 11b located in the dock 4 are contained in receptacles 13a and 13b, respectively. In the example illustrated by FIG. 4, the receptacle 13a is housed within the replaceable fluid container 3. In the example illustrated by FIG. 4, a first part of the heat exchange interface 12a is provided on the receptacle 13a containing the phase change material 11a, e.g. on at least one wall 131 of the receptacle 13a.

In the example illustrated by FIG. 4, the heat exchange interface 12a also comprises a second part comprising pipework 121a. In the example illustrated by FIG. 4, the pipework 121a is provided within the receptacle 13a, with extremities 122a and 123a in fluidic communication with the replaceable fluid container 3. In the example illustrated by FIG. 4, the pipework 121a may enlarge the surface area of the heat exchange interface 12a compared to a situation where the heat exchange interface 12a only comprises the wall 131.

In the example illustrated by FIG. 4, the heat exchanger 1 comprises two control valves 14a, e.g. provided at the extremities 122a and 123a of the pipework 121a. The two control valves 14a are configured to control a flow of the fluid 33 in the heat exchange interface 12a in the replaceable fluid container 3, as explained below.

In a closed configuration of the valves 14a, the fluid 33 may not flow in the pipework 121a, and the surface area of the heat exchange interface 12a is limited to the first part, e.g. to the wall 131 only. In some examples, the wall 131 may be a thermal insulator so that heat exchange between the phase change material 11a and the fluid 33 is minimal. The phase change material 11, once in a liquid phase, is configured to store the heat, e.g. after the engine 22 is shut down and e.g. up until a cold restart of the engine 22 and/or up until the fluid 33 has cooled down.

In an open configuration of the valves 14a, the fluid 33 may flow in the pipework 121a, thereby enlarging the surface area of the heat exchange interface 12a compared to the situation described with reference to the closed configuration of the valves 14a. It should be understood that in some examples the heat exchanger 1 may not comprise the control valves 14a.

In the example illustrated by FIG. 4, the heat exchange interface 12b comprises pipework 121b. In the example illustrated by FIG. 4, the pipework 121b is provided within the receptacle 13b, with extremities 122b and 123b in fluidic communication with a fluid path 133 of the fluid circulation system 23 located in the dock 4. In the example illustrated by FIG. 4, the pipework 121b may enlarge the surface area of the heat exchange interface 12b compared to a situation where the heat exchange interface 12b only comprises, e.g. a wall 132 in proximity with the fluid path 133 of the fluid circulation system 23 located in the dock 4.

In the example illustrated by FIG. 4, the heat exchanger 1 comprises two three-way valves 14b, e.g. provided at the extremities 122b and 123b of the pipework 121b and on the fluid circulation system 23, e.g. on the fluid outlet for supplying fluid from the replaceable fluid container 3 to the fluid circulation system 23. The two three-way valves 14b are configured to control a flow of the fluid 33 in the heat exchange interface 12b in the dock 4, as explained below.

In a first configuration of the valves 14b, illustrated by arrow A, the fluid 33 may not flow in the pipework 121b, and the surface area of the heat exchange interface 12b is limited, e.g. to only e.g. the wall 132. In some examples, the wall 132 may be a thermal insulator so that heat exchange between the phase change material 11b and the fluid 33 is minimal.

In a second configuration of the valves 14b, illustrated by arrow B, the fluid 33 may flow in the pipework 121b, thereby enlarging the surface area of the heat exchange interface 12b compared to the situation described with reference to the first configuration of the valves 14b.

It should be understood that other numbers of valves are envisaged, and the heat exchanger 12 may comprise a single valve or more than two valves.

The one or more valves 14a and/or 14b may be configured to be controlled by a controller 25 of the vehicle 2.

Figure 5:
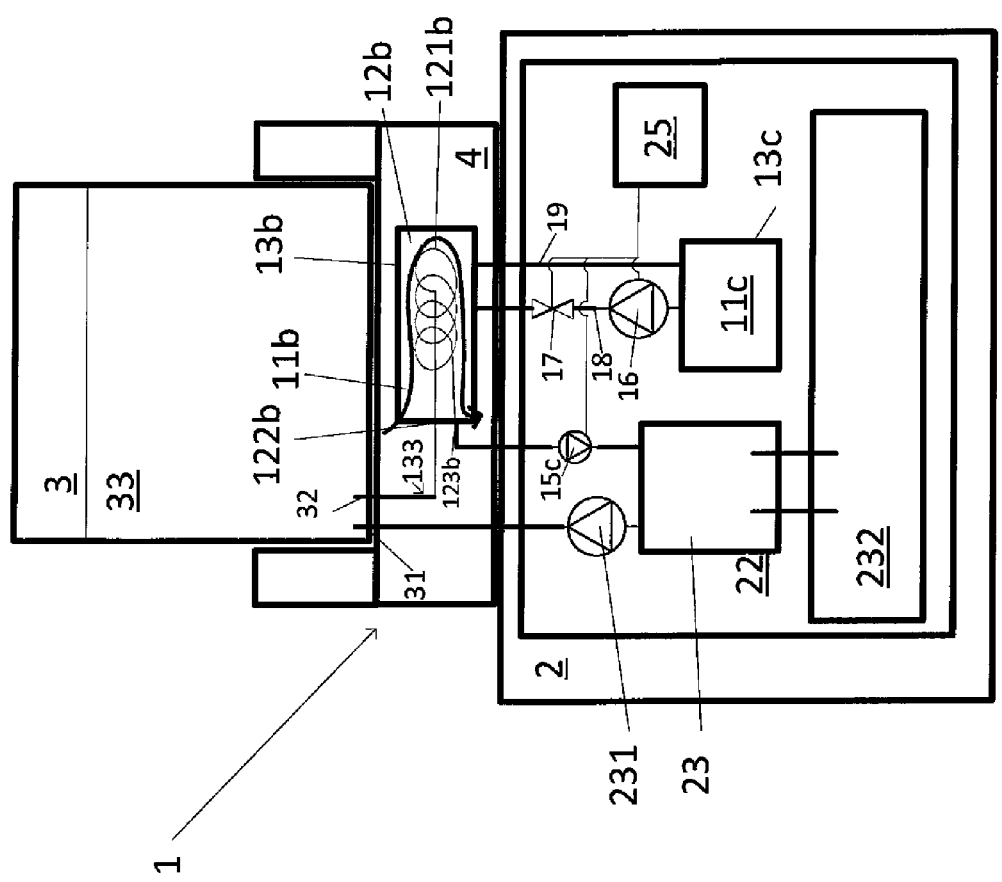
FIG. 5 shows a schematic illustration of a fifth example heat exchanger.

The example illustrated by FIG. 5 comprises elements of the example illustrated by FIG. 1. The elements in common in the examples illustrated by FIG. 5 and by FIG. 1 will not be described here for the sake of conciseness and clarity.

In the example illustrated by FIG. 5, the heat exchanger 1 for the vehicle 2 comprises:
the phase change material 11b, configured to be located in the dock 4; and
the phase change material 11c configured to be located in a part of the vehicle 2, other than the dock 4, not necessarily in the sump 232 of the fluid circulation system 23. In the example illustrated by FIG. 5, the phase change material 11c is configured to be located, e.g. on the engine 22 of the vehicle 2, but other location may be envisaged.

In the example illustrated by FIG. 5, the heat exchanger 1 for the vehicle 2 comprises the heat exchange interface 12b configured to be located in the dock 4.

In the example illustrated by FIG. 5, the phase change material 11b located in the dock 4 is contained in a receptacle 13b, and the phase change material 11c located on the engine 22 is contained in a receptacle 13c. In the example illustrated by FIG. 5, the receptacle 13b is housed within the dock 4.

In the example illustrated by FIG. 5, the heat exchange interface 12b comprises pipework 121b. In the example illustrated by FIG. 5, the pipework 121b is provided within the receptacle 13b, with extremities 122b and 123b in fluidic communication with the fluid path 133 of the fluid circulation system 23 located in the dock 4, and the fluid 33 from the replaceable fluid container 3 flows through the pipework 121b of the heat exchange interface 12b.

In the example illustrated by FIG. 5, the heat exchanger 1 further comprises a pump 15c provided on the fluid circulation system 23, for example a pump for supply of fluid from the replaceable fluid container 3 to the fluid circulation system 23. The pump 15c is also configured to control a flow of the fluid 33 in the heat exchange interface 12b in the dock 4, e.g. by regulating the flow of the fluid 33 in the heat exchange interface 12b. In some examples, the pump 15c may be controlled by the controller 25.

In the example illustrated by FIG. 5, the receptacle 13b and the receptacle 13c are in fluidic communication with pipework 18 and 19 configured to allow circulation of at least the phase change material 11c, in a liquid form, between the receptacle 13b and the receptacle 13c. Additionally or alternatively, the pipework 18 and 19 is also configured to allow circulation of the phase change material 11b, in a liquid form, between the receptacle 13b and the receptacle 13c. The receptacle 13c located in the engine 22 increases the amount of phase change material available for the heat exchange interface 12b located in the dock 4, compared to a situation with the receptacle 13b only.

In the example illustrated by FIG. 5, the heat exchanger 1 further comprises a pump 16 and a control valve 17 provided on the pipework 18. The pump 16 and the control valve 17 are configured to control a flow of at least the phase change material 11c, once in a liquid form, in the heat exchange interface 12b located in the dock 4, e.g. by regulating the flow of the liquid phase change material 11c in the heat exchange interface 12b, e.g. in the receptacle 13b.

In some examples, the pump 16 and/or valve 17 may be controlled by the controller 25.

It should be understood that, in some embodiments, the heat exchanger 1 may comprise only a pump 16 and no control valve 17, or only a control valve 17 and no pump 16, or no pump 16 and no control valve 17.

Additionally or alternatively, the pipework 18 and 19 is also configured to allow circulation of the phase change material 11b, in a liquid form, around the receptacle 13b, for heat exchange between the phase change material 11b and the phase change material 11c.

In some examples, the phase change material 11b and the phase change material 11c may be the same type of phase change material, e.g. both Barium Hydroxide as a non-limiting example, or may be different respective types of phase change materials.

In some examples, the heat exchanger 1 may be configured to be controlled by the controller 25 of the vehicle 2 such that heat is exchanged between the phase change material 11 and the fluid 33 of the replaceable fluid container before ignition of the vehicle 2. In some examples, at least one of the pumps allowing the fluid 33 to flow within, into and/or from a replaceable fluid container 3 may be operated before ignition of the vehicle 2, such that:

the fluid 33 may be warmed up before ignition of the vehicle 2, for example in the case where the fluid 33 is a lubricating oil, or such that another fluid may be warmed up by the fluid in the fluid 33 before ignition of the vehicle 2, for example in the case where the heat exchanger is associated with a heating, ventilating and air conditioning system of the vehicle.

In some examples, the receptacle 13 containing the phase change material 11 may comprise thermal insulation located or at least partly located around the phase change material 11.

In the examples of FIGS. 1 to 5, the dock 4 and the replaceable fluid container 3 are illustrated as not being a part of the vehicle 2. It should be understood that, in some examples, the dock 4 and/or the replaceable fluid container 3 may form, at least partly, part of the vehicle 2. In such examples, the dock 4 and/or the replaceable fluid container 3 may be located under a bonnet of the vehicle 2.

While aspects of the disclosure have been described in relation to vehicles and examples of the disclosure described the use of fluid for vehicles, it is envisaged that features of the disclosure could find other applications, as explained below.

For example, a replaceable fluid container according to an aspect of the disclosure could be used in relation to a wide range of equipment, such equipment including but not being limited to the vehicle described above. For example, the replaceable fluid container could find applications in relation to various static or mobile pieces of equipment, e.g. to supply the fluid to the equipment or to at least a region of the equipment, for example in relation to equipment including:

one or more industrial machines (such as a lathe as a non-limiting example), and/or one or more manufacture machines, and/or one or more assembly machines, and/or one or more tools, for example a hand tool (such as a hedge trimmer or a leaf blower as non-limiting examples), and/or any type of engine, such as an engine of a vehicle or a lawn mower as non-limiting examples.

It should be understood that the apparatus comprising the heat exchanger according to any aspect of the disclosure may comprise, at least partly, or may be:

the replaceable fluid container 3, and/or the dock 4, and/or the equipment or the vehicle, and/or a part of the equipment or the vehicle, other than the dock.

In such examples, the part of the equipment or the vehicle may comprise, at least partly, the engine of the vehicle, such as the sump of the vehicle.

As non-limiting examples, the phase change material may comprise:

a salt solution, such as one or more salt hydrates, e.g. in the form $M_nH_2O$, and/or containing Barium Hydroxide, and/or one or more eutectics phase change materials.

Other phase change materials are envisaged.

In some examples, the controller 25 may form, at least partly, part of the engine control unit (ECU) of the vehicle. Additionally or alternatively, in some examples, the controller 25 may form, at least partly, part of the dock 4, such as part of a data transceiver of the dock 4. In some examples, the data transceiver of the dock may be configured to receive data from a data provider of the container 3 and provide data to the vehicle, e.g. after a processing by a controller. Additionally or alternatively, in some examples, the controller 25 may form, at least partly, part of the container 3, such as part of the data provider of the container 3. In some examples, the controller 25 may not be a single entity, but may be distributed in different parts of the vehicle 2, and/or in different parts of the dock 4, and/or in different parts of the container 3.

The controller 25 may comprise a memory and a processor. The processor associated with the controller 25 may be a controller such as a microcontroller or the like with the controller managing communication (which may be encrypted communication) with the container 3 and/or with the vehicle 2, for example with a communications (e.g. controller area network (CAN) bus that couples with the engine control unit (ECU) or engine management system.

The container 3 may be a container for a fluid which is a liquid. Examples of suitable liquids include engine lubricating oil and heat exchange fluid for an electric engine.

The data provider of the replaceable fluid container may comprise a processor. The data provider may comprise a memory for storing data describing the fluid in the replaceable fluid container. For example, the memory may store data including at least one of: the grade of the fluid, the type of fluid, the date on which the container was filled or refilled, a unique identifier of the container, an indication of whether the container is new, or has previously been refilled or replaced, an indication of the vehicle mileage, the number of times the container has been refilled or reused, and the total mileage for which the container has been used.

The processor associated with the controller 25 may also read and/or write data to a memory or data store of the data provider of the container. This data may be encrypted and may include vehicle data and sensor parameters. Data storage may be carried out at start-up and periodically as a vehicle carrying the container accumulates miles of distance travelled and duration of engine running.

In some examples, the container 3 may be provided as a self-contained container containing fresh, refreshed or unused lubricating oil which may easily replace a container (e.g. on the dock 4) which is empty or contains used or spent lubricating oil. The container 3 may contain a filter. If the container 3 also comprises the filter, the filter is also replaced together with the spent or used lubricating oil. Thus, a replaceable fluid container 3 containing spent or used lubricating oil retained in fluidic communication with the vehicle engine fluid circulation system 23 may be disconnected from the vehicle engine fluid circulation system 23, removed from the vehicle and replaced by a container containing fresh, refreshed or unused lubricating oil and if present a fresh, renewed or new filter.

In some examples, a part of the replaceable fluid container 3 (for example a part comprising the ports and/or the filter when a filter is present and/or the receptacle 13 when a receptacle is present) may be separated from another part of the container, and a new part may be attached to the other part. Parts may thus be re-used and/or recycled. In some examples, when a receptacle is present in a replaceable fluid container, the receptacle 13 may be a replaceable element in the context of the fluid container, i.e.:

the receptacle 13 may be supplied in an unused replaceable fluid container, and/or the receptacle 13 may be removed from the other elements of the replaceable fluid container, in a non-destructive manner, i.e. in a manner which enables its re-coupling to the same or another replaceable fluid container, should that be desired, and/or the same or another receptacle can be re-coupled to the other elements of the same or another replaceable fluid container, in a non-destructive manner.

It should be understood that in some examples the receptacle may be within a same replaceable fluid container through a life cycle of the replaceable fluid container.

In some examples, the vehicle may comprise at least one electric drivetrain. In some examples, the vehicle may be a hybrid vehicle.

In some examples, the vehicle comprises a battery. The battery of the vehicle may be configured to provide at least a part of an electrical power required for operation of the electric drivetrain and/or the pumps and/or valves.

The engine lubricating oil may comprise at least one base stock and at least one engine lubricating oil additive. Suitable base stocks include bio-derived base stocks, mineral oil derived base stocks, synthetic base stocks and semi synthetic base stocks. Suitable engine lubricating oil additives are known in the art. The additives may be organic and/or inorganic compounds. Typically, the engine lubricating oil may comprise about 60 to 90% by weight in total of base stocks and about 40 to 10% by weight additives. The engine lubricating oil may be a lubricating oil for an internal combustion engine. The engine lubricating oil may be a lubricating oil for a spark ignition internal combustion engine. The engine lubricating oil may be a lubricating oil for a compression ignition internal combustion engine. The engine lubricating oil may be a mono-viscosity grade or a multi-viscosity grade engine lubricating oil. The engine lubricating oil may be a single purpose lubricating oil or a multi-purpose lubricating oil.

The container may be a container for heat exchange fluid for an electric engine. Thus, the container may contain heat exchange fluid for an electric engine. In such a case, the container may be provided as a self-contained container containing fresh, refreshed or unused heat exchange fluid for an electric engine which may easily replace a container (e.g. on the dock 4) which can be empty or can contain used or spent heat exchange fluid. If the container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The replaceable fluid container may provide a heat storage container in which heat exchange fluid may be stored for use to heat the electric engine when required. The replaceable fluid container may provide a container for storage of coolant at a temperature below the operating temperature of the engine for use to cool the electric engine when required.

Suitable heat exchange fluids for electric engines, which may have additional functionality (such as the primary function) which may include for example charge conduction and/or electrical connectivity, may be aqueous or non-aqueous fluids. Suitable heat exchange fluids for electric engines may comprise organic and/or non-organic performance boosting additives. Suitable heat exchange fluids may be man-made or bio-derived, for example Betaine. The heat exchange fluids may have fire retarding characteristics and/or hydraulic characteristics. Suitable heat exchange fluids include phase change fluids. Suitable heat exchange fluids include molten metals or salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

The fluid may be any type of fluid circulated in the engine and/or circulated in any fluid circulation system associated with the engine (that is the fluid is not necessarily circulated in the engine) to support a function of the engine and/or the vehicle. The function may be an ancillary function of the engine. For example the fluid may be a de-icer and/or any hydraulic fluid such as a fluid used in braking systems, and/or a pneumatic fluid, a washer fluid, a fuel additive or any other fluid associated with any function of the engine and/or the vehicle.

The disclosure may be applied to vehicles having a "dry sump" or a "wet sump".

One or more containers may be inserted and/or seated and/or docked in the dock. The dock may be a physical structure in which the container is seated and then docked. As another possibility, the dock may simply be a fluid coupling or couplings of the engine fluid circulation system for coupling to the at least one fluid port of the container.

In some examples, fluid outlet ports may comprise a non-return valve. The non-return valve may prevent or at least inhibit fluid from draining back to the container when the engine is not operating and may help keep a fluid line to a circulating pump full of fluid so that circulation of fluid is immediate when operation of the engine is started. Additionally or alternatively, fluid inlet ports may comprise a control valve or shut-off valve which may be closed when the vehicle engine is not operating, for example to prevent or reduce fluid draining from the container to the engine. Additionally or alternatively, some ports may not contain any valves because fluid, for example gas and/or vapour, may be required to flow both to and from the container through the port when the container is connected to the vehicle engine fluid circulation system.

The fluid ports may comprise fluid couplings, which may be self-sealing.

Suitable vehicles include motorcycles, earthmoving vehicles, mining vehicles, heavy duty vehicles and passenger cars. Powered water-borne vessels are also envisaged as vehicles, including yachts, motor boats (for example with an outboard motor), pleasure craft, jet-skis and fishing vessels. Applications of the disclosure are envisaged for parts only of the vehicles, for example parts including one or more moving parts (for example a gearbox).

The container may be manufactured from metal and/or plastics material. Suitable materials include reinforced thermoplastics material which for example, may be suitable for operation at temperatures of up to 150° C. for extended periods of time.

The container may comprise at least one trade mark, logo, product information, advertising information, other distinguishing feature or combination thereof. The container may be printed and/or labelled with at least one trade mark, logo, product information, advertising information, other distinguishing feature or combination thereof. This may have an advantage of deterring counterfeiting. The container may be of a single colour or multi-coloured. The trademark, logo or other distinguishing feature may be of the same colour and/or material as the rest of the container or a different colour and/or material as the rest of the container. In some examples, the container may be provided with packaging, such as a box or a pallet. In some examples, the packaging may be provided for a plurality of containers, and in some examples a box and/or a pallet may be provided for a plurality of containers.

With reference to the drawings in general, it will be appreciated that schematic functional block diagrams are used to indicate functionality of elements, systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout elements, systems and apparatus of the disclosure. In some embodiments the function of one or more elements shown in the drawings may be integrated into a single functional unit.

The above embodiments are to be understood as illustrative examples. Further embodiments are envisaged. It is to be understood that any feature (such as pumps, valves, pipework, heat exchangers, heat exchange interfaces) described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and elements, systems and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Other variations and modifications of the apparatus will be apparent to persons of skill in the art in the context of the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A heat exchanger for equipment including a dock, comprising:
    at least one phase change material; and
    at least one heat exchange interface for heat exchange between the phase change material and a fluid flowing within, into or from a replaceable fluid container for the equipment, the replaceable fluid container comprising at least one fluid port adapted to couple to and be in fluidic communication with a fluid path of a fluid circulation system of the equipment when the replaceable fluid container is coupled to the dock of the equipment, wherein the phase change material and the heat exchange interface are located, at least partly, in the dock.

2. The heat exchanger of claim 1, wherein the phase change material comprises:
    a salt solution, in the form MnH2O, or containing Barium Hydroxide, or one or more eutectics phase change materials.

3. The heat exchanger of claim 2, wherein the phase change material comprises one or more salt hydrates.

4. The heat exchanger of claim 1, further comprising at least one valve configured to control a flow of the fluid or of the phase change material in the heat exchange interface.

5. The heat exchanger of claim 4, wherein the valve is configured to be controlled by a controller.

6. The heat exchanger of claim 5, wherein the controller comprises a controller of the equipment.

7. The heat exchanger of claim 1, further comprising a pump configured to cause the fluid or the phase change material to flow in the heat exchange interface.

8. The heat exchanger of claim 7, wherein the pump is configured to be controlled by a controller.

9. The heat exchanger of claim 8, wherein the controller comprises a controller of the equipment.

10. The heat exchanger of claim 1, associated with a heating, ventilating and air conditioning system.

11. The heat exchanger of claim 10, wherein the heating, ventilating and air conditioning system comprises a heating, ventilating and air conditioning system of the equipment.

12. The heat exchanger of claim 1, configured to be controlled by a controller of the equipment such that heat is exchanged between the phase change material and the fluid of the replaceable fluid container before operation of the equipment.

13. The heat exchanger of claim 1, wherein the fluid in the replaceable fluid container is one or more of:
- a lubricating oil,
- a de-icer,
- a hydraulic fluid,
- a pneumatic fluid,
- a washer fluid,
- a fuel additive, a charge conduction liquid,
- an electrical connectivity liquid, and
- a heat exchange fluid.

14. The heat exchanger of claim 1, wherein:
the heat exchange interface is provided on a receptacle containing the phase change material, or wherein:
the heat exchange interface comprises pipework.

15. The heat exchanger of claim 1, wherein the equipment comprises at least one or more of:
- an industrial machine, or
- a manufacture machine, or
- an assembly machines, or
- a tool, such as a hand tool, or
- an engine, or
- a vehicle.

16. The heat exchanger of claim 15, wherein the tool comprises a hand tool.

17. An apparatus comprising a heat exchanger the heat exchanger comprising:
at least one phase change material; and
at least one heat exchange interface for heat exchange between the phase change material and a fluid flowing within, into or from a replaceable fluid container for equipment, the replaceable fluid container comprising at least one fluid port adapted to couple to and be in fluidic communication with a fluid path of a fluid circulation system of the equipment when the replaceable fluid container is coupled to a dock of the equipment, wherein the phase change material and the heat exchange interface are located, at least partly, in the dock.

18. The heat exchanger of claim 1, wherein the replaceable fluid container comprises a data provider, wherein the dock further comprises a data transceiver configured to receive data from the data provider, and wherein the data transceiver is configured to provide data to the equipment.

19. The heat exchanger of claim 1, wherein the equipment is a vehicle comprising a bonnet, and wherein the dock is located under the bonnet.

20. A heat exchanger for a vehicle including a dock, comprising:
at least one phase change material; and
at least one heat exchange interface for heat exchange between the phase change material and a fluid flowing within, into or from a replaceable fluid container for the equipment, the replaceable fluid container comprising at least one fluid port adapted to couple to and be in fluidic communication with a fluid path of a fluid circulation system of the equipment when the replaceable fluid container is coupled to the dock of the vehicle, wherein the phase change material and the heat exchange interface are located, at least partly, in the dock.

* * * * *